June 25, 1935.   O. D. NORTH ET AL   2,006,000
MOTOR TRACTOR AND TRAILER
Filed Nov. 7, 1933   4 Sheets-Sheet 3
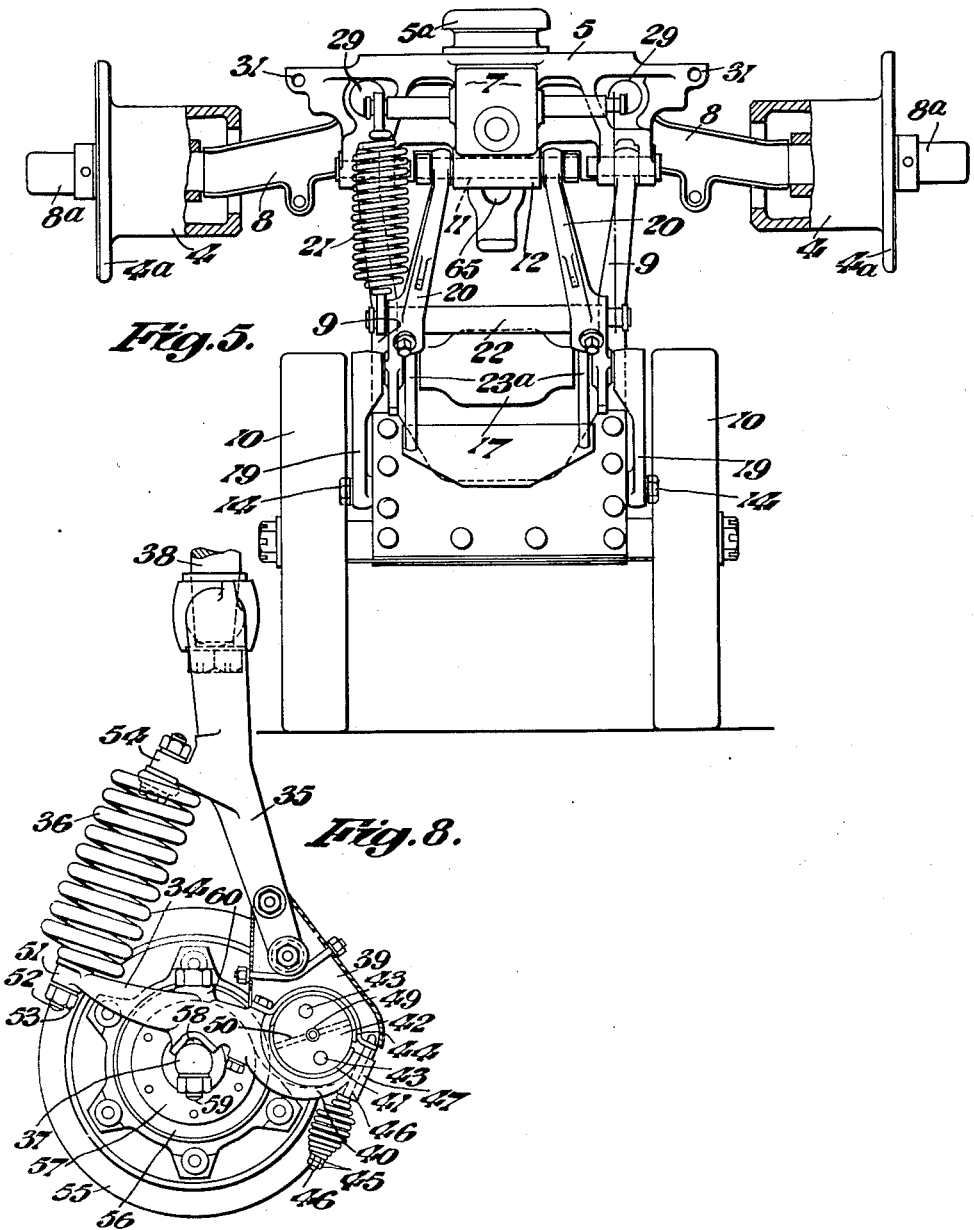
INVENTORS
OLIVER D NORTH
PERCY G HUGH
PER Rayner Ho
ATTORNEYS June 25, 1935.  O. D. NORTH ET AL  2,006,000
MOTOR TRACTOR AND TRAILER
Filed Nov. 7, 1933  4 Sheets-Sheet 4
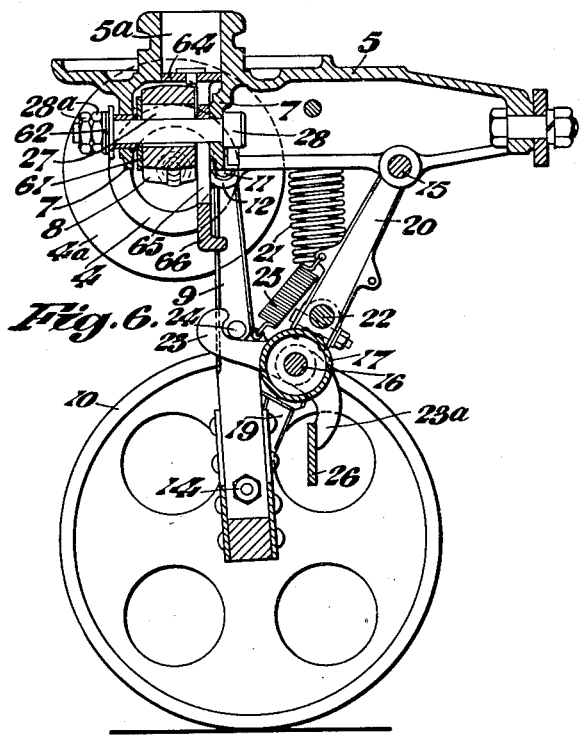
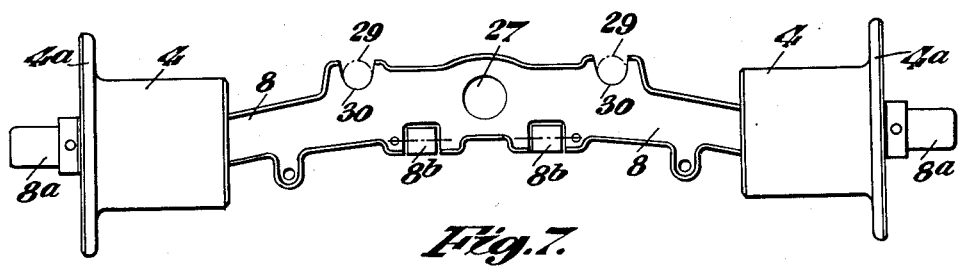
INVENTORS
OLIVER D NORTH
PERCY G HUGH
PER Rayner
ATTORNEYS Patented June 25, 1935

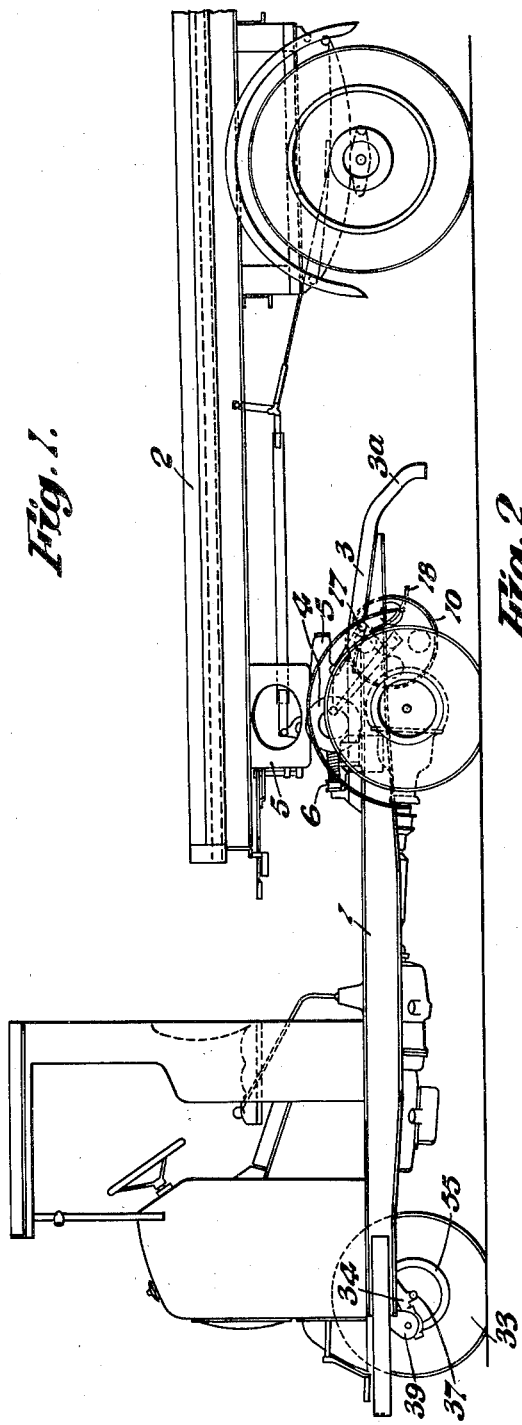

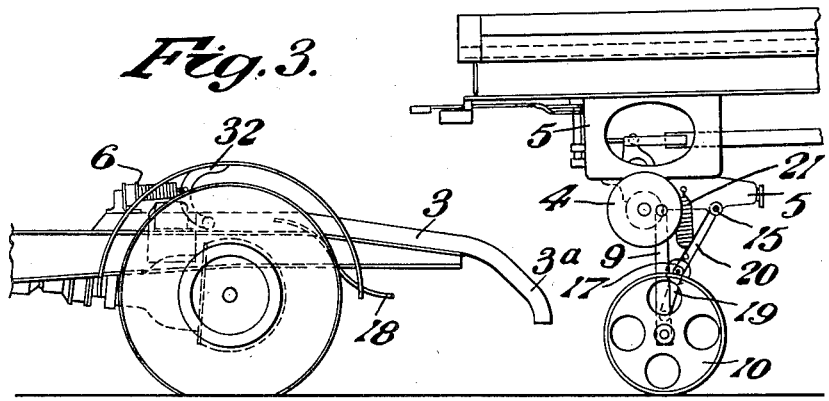
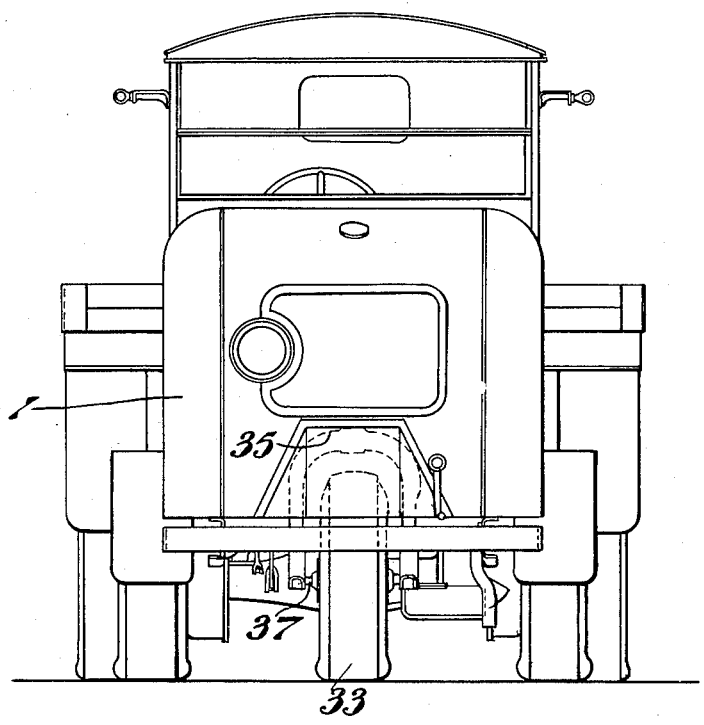

2,006,000

UNITED STATES PATENT OFFICE 2,006,000

MOTOR TRACTOR AND TRAILER

Oliver Danson North and Percy Garibaldi Hugh, London, England, assignors to Scammell Lorries Limited, London, England Application November 7, 1933, Serial No. 696,939
In Great Britain May 24, 1933

5 Claims. (Cl. 280—33.1)

This invention relates to motor vehicles of the type in which a tractor has coupled to it a trailer and in which the coupling is effected by moving one vehicle towards the other so that coupling members on the two vehicles are slid into engagement with each other, and in which when the two vehicles are uncoupled the trailer is supported at its normally coupled end by one or more auxiliary wheels lowered to the ground automatically, and raised clear of the ground when the vehicles are coupled. The present invention is primarily concerned with and consists essentially in the combination of a tractor and trailer both having characteristic features which are separately described and claimed in our co-pending application No. 696,938 filed Nov. 7, 1933 and Patent No. 1,972,354 issued Sept. 4, 1934. We have found that this combination is one which produces an exceptionally serviceable transport assembly and the object of the present invention is to obtain such a combination in the form productive of the best results when the tractor and trailer are coupled. Further objects and advantages arising out of our invention will be apparent hereafter.

According to this invention a combined tractor and trailer is provided with means for readily compensating for differences in inclination or plane of the two vehicles when they are being coupled combined with means for automatically releasing and locking one or more auxiliary supporting wheels of the trailer when the two vehicles are unlocked, said compensating means consisting of a transversely disposed oscillatable member carried by the trailer and formed with or carrying coupling members adapted to be slid into engagement with guides carried by the tractor. Also a front steering wheel mechanism is provided particularly suitable for use with said compensating means, the front steering wheel mechanism consisting of a single or central wheel supported between the limbs of the lower forked end of a steering column and connected to the said forked end by oscillatable supporting means incorporating a shock-absorbing device.

In order that the invention will be understood and carried into effect four sheets of drawings are appended hereto illustrating an embodiment thereof, and wherein:—

Fig. 1 is a side elevation view showing the tractor and trailer coupled.

Fig. 2 is a plan view of Fig. 1.

Fig. 3 shows the rear and front ends of the tractor and trailer respectively when uncoupled.

Fig. 4 is a front elevation view of the tractor.

Fig. 5 is a part sectional rear elevation view of the trailer.

Fig. 6 is a sectional side elevation view of Fig. 5 showing more particularly the coupling mechanism and the means for locking and releasing the auxiliary wheels of the trailer.

Fig. 7 is a detail front elevation view showing the means with the coupling mechanism for compensating for relative rocking motions of the tractor and trailer.

Fig. 8 is a detail side elevation view of the steering wheel suspension for the tractor.

Referring to the drawings the tractor and trailer are indicated generally by the reference numerals 1 and 2 respectively and they are adapted to be coupled by backing the tractor into the front end of the trailer for which purpose the rear portion of the tractor is provided with a pair of ramps 3, 3 the rear ends of which are inclined downwardly as indicated at 3a and which are adapted to engage with suitable rollers 4 on the front part of the trailer 2 preferably mounted on or supported by a turn-table 5 upon which the forward end of the trailer is supported and about which it may swivel. The ramps 3 are mounted on or form a part of the tractor frame and project rearwardly from the ends thereof. At a convenient point on these ramps, preferably at or near the front ends thereof, are provided suitable buffers or stops 6 to limit the extent which the rollers or other abutments on the trailer may move along the ramps. These buffers or stops are preferably resiliently mounted or provided with soft or resilient portions to engage the roller or other abutments on the trailer.

In a convenient arrangement the centre portion of the turn-table is pivotally secured beneath the forward end of the trailer 2 and is provided with suitable brackets or supporting members 7 in which is mounted a transverse beam 8. Upon this beam are mounted the roller abutments 4 which are adapted to engage and ride over the ramps 3 on the tractor. The rollers may conveniently be formed with flanges 4a on one or both sides and the ends of the ramps may be tapered so as to facilitate engagement between the rollers and the ramps. Depending from the portion of the turn-table which is pivotally connected to the front of the trailer are provided suitable struts or legs 9 which in turn support temporary road wheels 10 adapted to be brought into a convenient position to engage the ground and support the front of the trailer when not coupled up to a tractor. These struts or legs 9 may conveniently be hinged or journalled upon the transverse beam supporting the roller abutments or as shown may be mounted upon a separate shaft 11 supported in a sleeve 12 disposed across the base of the turn-table 5. When the trailer is not coupled up to a tractor these struts or legs 9 are turned about their bearings so as to lower the supporting wheels 10 onto the ground and the struts or legs 9 then preferably adopt a substantially vertical position as shown in Fig. 6. The struts or legs are also connected to the rear portion of the turn-table 5 by means of two pairs of hinged elbow links the lower ones 19 of which are pivotally connected by a pin or bolt 14 to the struts or legs whilst the others 20 are pivotally connected to the turn-table as at 15, the free ends of the two links being pivoted together as at 16. The links 19 and 20 may then act as a toggle locking device to retain the struts or legs 9 carrying the wheels in position for supporting the trailer when the pivots 14, 15 and 16 would be in line. They also serve as a means for lifting and lowering the struts or legs during the coupling or uncoupling of the tractor or trailer. For this purpose the links may be arranged in symmetrical pairs with a roller 17 or other abutment mounted upon the pivot 16 which connects them together, and this roller is adapted to engage a curved or otherwise suitably shaped longitudinally centrally disposed lifting and lowering rail 18 mounted on or supported by the tractor. This lifting or lowering rail may comprise a suitable bar or strip of convenient section bent to the desired form and mounted upon a convenient part of the tractor so that when the tractor and trailer are brought together for coupling purposes the roller 17 on the hinged links will engage with the rail. This preferably takes place after the roller abutments 4 on the turn-table of the trailer have engaged and are supported by the ramps 3 on the tractor. Further movement between the tractor and trailer so as to bring them together for coupling purposes will cause the rail 18 on the tractor to press back the roller 17 located at or near the pivot point between the hinged links 19, 20. This will cause the hinge links to turn about their pivots whilst the roller 17 or other abutment rides on the rail 18, the combined effect being to cause the hinged links 19 and 20 to fold up, turning the struts or legs about their hinge connection 11 to the turn-table 5 of the trailer so as to raise the wheels supported by their lower ends. The relative movement between the tractor and trailer continues until the rollers 4 on the turn-table of the trailer engage with the buffers or stops 6 on the tractor. At this position the pivotal connection 14 of the lower of the hinged links connected to the struts or legs 9 will be located at a position corresponding substantially with the centre of an arcuate portion of the lifting or lowering rail 18 with which the roller 17 on the hinged links engages. Any relative movement which takes place between the tractor and trailer when they are locked in the engaged position will then simply cause the roller to ride along the arcuate portion of the lifting and lowering rail without causing any appreciable movement of the struts or legs carrying the wheels which support the trailer when not coupled to a tractor.

In order to lock the tractor and trailer in the coupled positions, suitable hook-like catches may be provided on the tractor and these hook-like catches are adapted to engage with the rollers 8b supported in the transverse beam 8. The hook-like catches on the tractor may either be spring operated to ensure engagement or may be manually controlled for this purpose. In a convenient arrangement stout catches 8c having hook-shaped ends are pivotally connected to the tractor as at 8d and are controlled by strong springs 8e so as to ensure positive engagement between them and the rollers 8b on the transverse beam 8. The reverse operation of uncoupling the tractor from the trailer simply consists in releasing the locking catches by a pull on a cable 8f and driving the tractor slowly in a forward direction. The trailer is preferably held stationary by the application of brakes to the trailer wheels or other suitable means and the tractor will therefore move away from it, the ramps on the tractor sliding beneath the roller or other abutments on the trailer turn-table. As the ramps 3 are withdrawn the forward end of the trailer will be lowered owing to the downward inclination of the end of the ramps. At the same time the roller 17 on the hinged links 19, 20 will move downwardly along the raising and lowering rail 18 causing the links to move toward a straightened-out position and at the same time lowering the struts or legs and the trailer supporting wheels thereon. In order to ensure that the hinged links and the struts or legs will be brought to and locked in a position to support the front end of the trailer, a part of the ramps or the lowering and raising rail may be arranged to engage with the struts or legs so as to straighten them out. Suitable strong tension springs 21 are arranged between the hinged links 20 and the turn-table so as to ensure that they will be brought substantially into line with each other to positively lock the hinged struts or legs 9 in the supporting position, these springs being connected to the ends of a transverse rod 22 connected across the upper links 20.

To prevent the links 19 and 20 from being folded so as to cause collapse of the wheel carrying legs 9 when the uncoupled trailer is pushed forwards a pair of hooks 23 are pivoted on the pivot member 16 and are formed with their hooks foremost adapted to trip under and engage around lateral projections 24 on the sides of the legs 9, coiled tension springs 25 connected across these hooks and the links 20 ensuring this engagement. These hooks are disengaged when the tractor is backed into and coupled to the trailer by the centre rail 18 of the tractor striking a transverse plate 26 connected across depending rearward extensions 23a of the hooks 23.

In order to ensure the tractor and trailer being readily coupled when on irregular or laterally sloping ground it is desirable to arrange the member 8 carrying the ramp engaging rollers 4 so that it readily adapts itself to differences in levels of the two vehicles. Also it is desirable that this adjustment should be free to operate when the two vehicles are coupled to obviate excessive torsional stresses on the frame members of the vehicles. For this purpose the beam 8 is supported in such manner that it will take the tension of the coupling and will move relatively to the trailer turntable the requisite amount to compensate for variations in the relative angular positions of the two vehicles. For this purpose the beam 8 is formed as a transverse beam of girder section and with spigoted ends 8a to take the rollers 4 and the centre of this beam is loosely coupled to the turntable 5.

The preferred method of mounting the beam 8 consists in forming a central circular aperture 27 in the beam to receive but quite loosely fit a coupling bolt 28 passed through the lugs 7 depending from the turntable 5. By this means the beam 8 is free to move relatively to the turntable of the trailer such relative movement being about either one of a pair of stout bosses or pins 29 located equidistantly each side of the bolt 28 and carried by the turntable 5, the beam being provided with substantially semi-circular or U shaped recesses 30 in its upper edge to form seatings for these pins 29. By this means when the ends of the beam 8 are firmly supported by the rollers 4 and the ramps 3 the trailer is free to tilt sideways relatively to the tractor an amount corresponding to the angle which the aperture 27 will permit either end of the beam 8 to swing about either pin 29. If desired, coiled tension springs can be connected across lugs 31 on side wings of the turn-table 5 and on the beam 8 to normally maintain both pins 29 firmly seated in the recesses 30.

A pair of buffers 32 (Fig. 3) can be pivoted on a transverse axis on the ramps 3 adapted to act as abutments against which the rollers 4 engage. These buffers 32 are backed up by coil springs or other resilient means so as to enable the buffers to resiliently absorb the shock of engaging the parts during coupling of the tractor and trailer.

The manœuvering and also the aforesaid relative adjustments of the positions of the two vehicles is materially facilitated by combining with the above mentioned tilting beam 8 a central single steering wheel 33 on the tractor as this coupled with a particular form of suspension associated with such steering wheel enables the tractor to more readily adapt itself to variations in contours of the ground and thereby obtaining the maximum benefit of the arrangement of the beam 8. For this purpose the steering wheel 33 is secured to a pair of arms 34 pivoted at their forward ends to a forked supporting member 35 and connected at their rear ends by coiled springs 36 to a portion of the forked supporting member 35 so as to permit a limited amount of cushioned oscillation of the arms 34 about their pivotal connection to the ends of the forked supporting member 35. The forked supporting member is suitably mounted in a steering head so that it may be turned about a vertical or nearly vertical axis for steering purposes.

The forked member 35 comprises an arched member which embraces the upper portion of the steering wheel 33 and the two lower ends of which project downwardly in advance of the axle 37 of the wheel. At the upper end of the forked member is provided a shank 38 adapted to engage in the steering head in which it is supported in any desired manner so that it may be turned about a vertical or nearly vertical axis for steering purposes. This axis is preferably arranged so as to provide a small amount of caster action to the steering.

To the lower ends of the limbs of the forked member 35 are pivotally secured the forward end of each pivoted arm 34 which is clamped between a pair of plates 39 mounted upon opposite sides of each fork end. On each side of the pivoted portion of the hinged arms is a rubber or other resilient washer located between it and the plates secured to the fork end, the whole being clamped together by means of a nut and bolt passed through the pivotal axis. Alternatively the pivotal end of each arm is provided with a semi-circular recess 40 to receive a friction band 41 disposed about a cylindrical centre block 42 secured by bolts 43 between the appropriate pair of plates 39, a clamping band 44 embracing the upper part of the band 41 and being adjustable in its pressure by nuts 45 threaded on to a stud 46, such stud being passed through one end of each band 44 and a guide bush 47 on the end of the arm 34 and a coiled compression spring 48 being interposed between the guide bush 47 and nuts 45 to produce resiliency in the pressure of the band 44. A central lubricating passage 49 communicates by radial passages 50 with the friction ring or band 41. This arrangement permits the pivoted arms 34 to oscillate to a limited extent about the pivotal axis by movement around the centre block located between the ends of the pivoted arms and the plates on the fork ends. This form of mounting enables heavy loads to be supported without permitting side play and also acts as a shock absorber or vibration damper.

The rear ends of the pivoted arms 34 are provided with bosses 51 against which one end of the stout coil spring 36 is firmly clamped by means of a clamping bolt 52 passed through the boss and secured by a suitable nut or nuts 53 and so arranged as to clamp the end of the spring firmly on the boss. The other end of each spring is similarly secured to a seating 54 formed at each side of the forked member so that the springs are permanently anchored at one end to the forked member and at the other end to the rear end of the pivoted arms.

The steering wheel comprises a suitable rim 55 for the reception of a pneumatic or other tire. The rim may if desired be split circumferentially and is clamped to a flange on the wheel hub. The wheel hub 56 is mounted on a suitable axle 37 by suitable ball, roller or other anti-friction bearings of a suitable size and capacity to deal effectively with both radial and lateral loads. The two ends of the axle 37 project beyond cover plates 57 on the hub and are adapted to be clamped directly to the pivoted arms 34 at a suitable position intermediate between their forward pivotal ends and the rear ends which are attached to the coil springs. For this purpose the hinged arms may be provided with a transverse recess 58 preferably on their undersides in which the projecting ends of the wheel axles engage. These recesses may as shown be substantially V shape in form and if desired the axle may be correspondingly shaped to engage in the recesses. A suitable bolt or bolts 59 may be passed directly through the axle 37 and through a boss or bosses 60 on each of the hinged arms so as to clamp the axle in position in the recesses on the pivoted arms, thus enabling the steering wheel to be easily removed and re-affixed. As an alternative U bolts may be arranged to pass round the axle and through bosses on the pivoted arms, the ends being drawn up tight by suitable nuts. Any other desired method of clamping the axle to the pivoted arms may be employed, the chief requirement being that the axle shall be rigidly secured thereto so as to obviate any risk of movement or looseness whilst at the same time permitting it to be quickly and easily detached for removal of a wheel and as quickly secured in position for replacement.

The tractive effort from the tractor to the trailer is transmitted between the beam 8 and the front lug 7, and consequently a thrust washer 61 is interposed between them. Adjustment to take up slack can be effected by the nuts 28a on the bolt 28, which act on a bush 62 slidably mounted in the front lug 7 and engaging against the thrust washer 61.

The brake mechanism of the trailer can be operated by the vertical reciprocation of a cylindrical member 64 slidably in a hollow king pin 5a of the turn-table, the upper end of this member 64 seating against a suitable brake lever member and the lower end being forked or slotted as at 65 to clear the bolt 28 and formed with a seating 66 against which is adapted to align and to be pressed a brake operating lever carried by the tractor. By this means the brakes of the trailer do not require to be disconnected when the vehicles are uncoupled or vice versa.

We claim:—

1. In a tractor and trailer, a transversely disposed substantially horizontal beam on the trailer, a turntable carrying said beam, a pair of ramps on the tractor, rollers on the ends of said beam adapted to engage and travel along said ramps to couple the two vehicles, a pivotal support carried by said turntable loosely receiving said beam, projections engaged by said beam on the opposite side of said support about which said beam is free to oscillate, and an auxiliary supporting wheel carried by said turntable.

2. In mechanism for coupling a tractor and trailer, a turntable on the trailer, a transversely disposed substantially horizontal beam carried by said turntable, a pair of longitudinal ramps on the tractor along which said beam is adapted to travel, coupling devices at the inner ends of said ramps to receive said beam, an aperture in the centre of said beam, a pivot pin on the turntable engaged in said aperture, said aperture loosely fitting said pin, projections on the turntable on either side of said pin, and recesses in the beam receiving said projections, whereby said beam is free to oscillate about one of the said projections an amount determined by the clearance between said aperture and said pivot pin.

3. In a combined tractor and trailer in which the trailer is entirely readily disconnectable from the tractor and is provided with an auxiliary supporting wheel, the provision of a transversely disposed beam on the trailer above said auxiliary wheel, and runners on the tractor along which the ends of said beam are adapted to travel, a pivotal support for said beam, and abutments either side of said pivotal support upon which said beam can oscillate when the vehicles are coupled.

4. In a combination of tractor and trailer adapted to form a five-wheeled vehicle when connected, means permitting coupling of the tractor and trailer when inclined laterally relative to each other, said means comprising a transversely disposed oscillatable arm on the front end of the trailer and a pair of ramps on the rear end of the tractor, rollers on the ends of said arm adapted to travel along said ramps, a central support for said arm, and projections either side of said support carried by the trailer, said beam being adapted to individually engage said projections between its ends and its centre and to oscillate upon either of said projections.

5. In a tractor and trailer a transversely disposed coupling member on the trailer, means permitting limited oscillation of the said coupling member about points between its centre and ends, and coupling guides on opposite sides of the longitudinal centre line on the tractor adapted to be slid into engagement with said oscillatable coupling member.

OLIVER DANSON NORTH.
PERCY GARIBALDI HUGH.